United States Patent
Kim et al.

(10) Patent No.: US 12,282,701 B2
(45) Date of Patent: Apr. 22, 2025

(54) WEARABLE ELECTRONIC DEVICE AND METHOD FOR PROCESSING AUDIO SIGNAL USING THE SAME

(71) Applicant: Samsung Electronics Co., Ltd., Suwon-si (KR)

(72) Inventors: Kyumin Kim, Suwon-si (KR); Hyunil An, Suwon-si (KR); Hyunjin Um, Suwon-si (KR); Hyojin Lee, Suwon-si (KR); Yongjoo Cho, Suwon-si (KR); Injune Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 253 days.

(21) Appl. No.: 17/986,446

(22) Filed: Nov. 14, 2022

(65) Prior Publication Data
US 2023/0185519 A1 Jun. 15, 2023

Related U.S. Application Data

(63) Continuation of application No. PCT/KR2022/017204, filed on Nov. 4, 2022.

(30) Foreign Application Priority Data

Dec. 14, 2021 (KR) .................. 10-2021-0178932
Jan. 18, 2022 (KR) .................. 10-2022-0007114

(51) Int. Cl.
G06F 3/16 (2006.01)
H04R 3/12 (2006.01)

(52) U.S. Cl.
CPC .............. G06F 3/165 (2013.01); H04R 3/12 (2013.01); H04R 2420/07 (2013.01)

(58) Field of Classification Search
CPC ... G06F 1/16; G06F 3/16; G06F 3/165; G06F 3/167; H04R 3/12; H04R 5/04; H04R 2420/07
(Continued)

(56) References Cited

U.S. PATENT DOCUMENTS 10,021,451 B2 7/2018 Lee et al.
10,963,211 B2 3/2021 Park et al.
(Continued)

FOREIGN PATENT DOCUMENTS

KR 10-2008-0040825 A 5/2008
KR 10-2009-0079379 A 7/2009
(Continued)

OTHER PUBLICATIONS

International Search Report dated Feb. 16, 2023, issued in International Application No. PCT/KR2022/017204.

Primary Examiner — Harry S Hong
(74) Attorney, Agent, or Firm — Jefferson IP Law, LLP

(57) ABSTRACT

A wearable electronic device is provided. The electronic device includes a processor operatively connected to a wireless communication circuit, a first audio mixer, a second audio mixer, a first audio output interface, a second audio output interface, and a speaker, the processor being configured to detect output of a plurality of audio signals including a first audio signal having a first property, transmit the first audio signal having the first property to the first audio mixer, transmit remaining audio signals to the second audio mixer, transmit the first audio signal to the first audio output interface to output the first audio signal through the speaker, synthesize the remaining audio signals into a second audio signal using the second audio mixer, and transmit the (Continued)

synthesized second audio signal to the second audio output interface to output the second audio signal through the external device.

16 Claims, 6 Drawing Sheets

(58) Field of Classification Search
USPC .............................................. 381/77, 79, 80
See application file for complete search history.

(56) References Cited

U.S. PATENT DOCUMENTS

| | | |
|---|---|---|
| 11,314,478 B2 | 4/2022 | Kim et al. |
| 11,405,725 B2 | 8/2022 | Park et al. |
| 2004/0125965 A1 | 7/2004 | Alberth, Jr. et al. |
| 2009/0186607 A1 | 7/2009 | Kim |
| 2014/0294194 A1 | 10/2014 | Park et al. |
| 2017/0156006 A1 | 6/2017 | Dennis |
| 2020/0014784 A1 | 1/2020 | Lee et al. |
| 2020/0219525 A1* | 7/2020 | Moon .................. H04R 1/1016 |
| 2021/0255823 A1 | 8/2021 | Kim et al. |

FOREIGN PATENT DOCUMENTS

| | | |
|---|---|---|
| KR | 10-2016-0041233 A | 4/2016 |
| KR | 10-2018-0109596 A | 10/2018 |
| KR | 10-2019-0028043 A | 3/2019 |
| KR | 10-2021-0105785 A | 8/2021 |
| KR | 10-2289474 B1 | 8/2021 |
| KR | 10-2291021 B1 | 8/2021 |

* cited by examiner

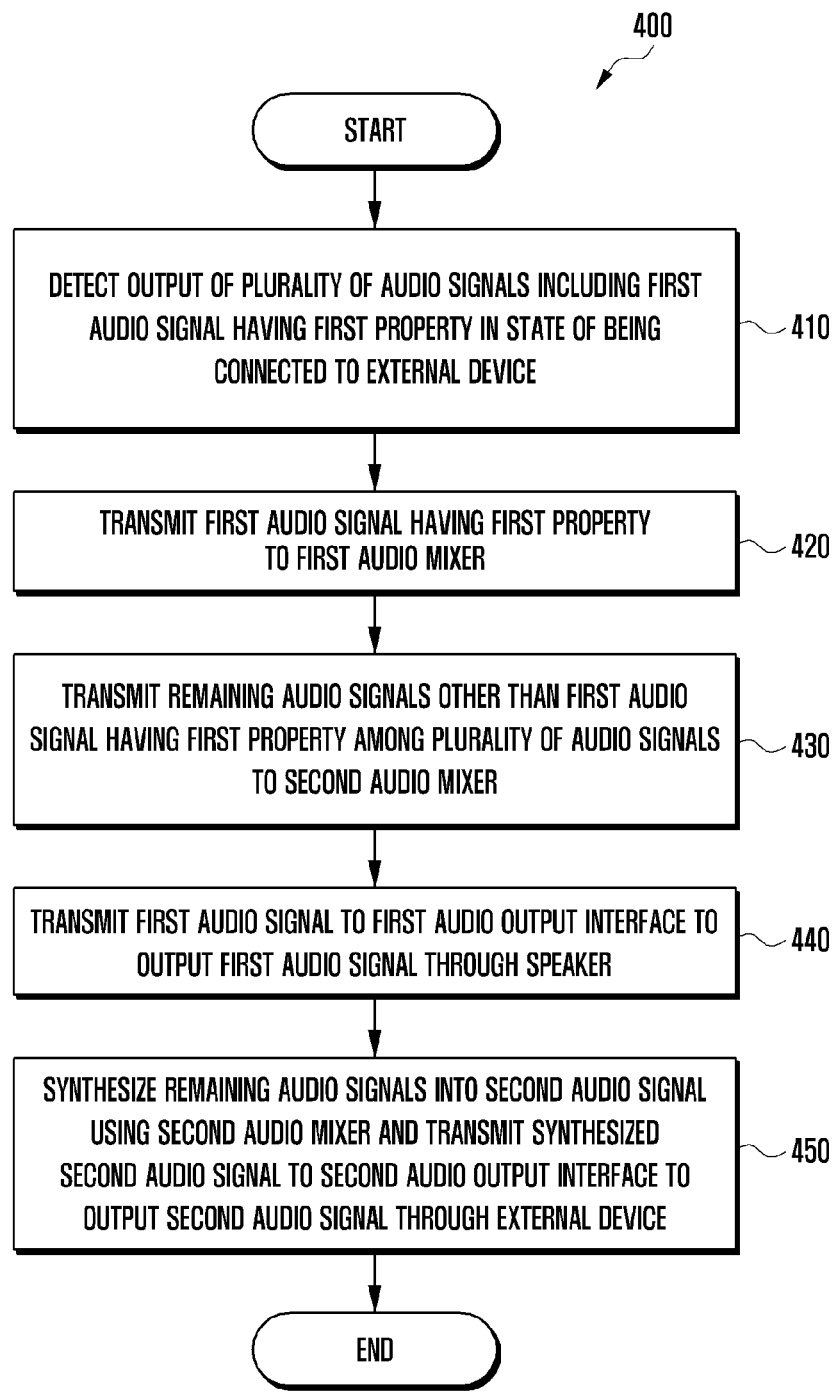

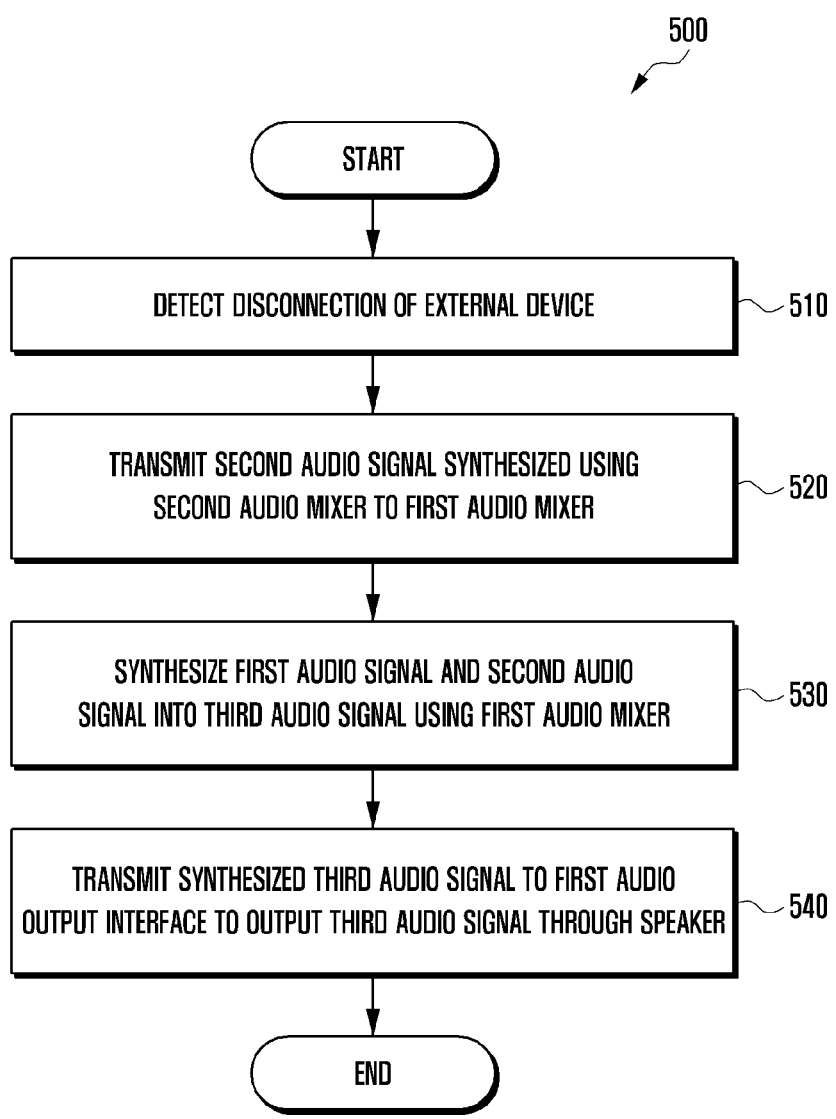

WEARABLE ELECTRONIC DEVICE AND METHOD FOR PROCESSING AUDIO SIGNAL USING THE SAME

CROSS-REFERENCE TO RELATED APPLICATION(S)

This application is a continuation application, claiming priority under § 365(c), of an International application No. PCT/KR 2022/017204, filed on Nov. 4, 2022, which is based on and claims the benefit of a Korean patent application number 10-2021-0178932, filed on Dec. 14, 2021, in the Korean Intellectual Property Office, and of a Korean patent application number 10-2022-0007114, filed on Jan. 18, 2022, in the Korean Intellectual Property Office, the disclosure of each of which is incorporated by reference herein in its entirety.

TECHNICAL FIELD

The disclosure relates to a wearable electronic device and a method for processing an audio signal using the same.

BACKGROUND ART

Recently, a wearable electronic device, for example, a smart watch, which provides various functions in conjunction with a smartphone, has been increasingly used. A smart watch is in the form of a watch, and may also provide various functions provided by a regular watch. For example, the smart watch may output various audio signals (e.g., audio signals, such as media and/or a notification) corresponding a plurality of functions, such as a sound of a second hand and/or a sound (e.g., a system operation sound) corresponding to a specific function (or specific application) of the smart watch, through a speaker of the smart watch.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A wearable electronic device (e.g., a smart watch) may control a speaker of the wearable electronic device not to operate when an external device (e.g., a wireless audio output device) is connected through a wireless communication circuit. In this case, since a plurality of audio signals, such as a sound of a second hand, media, and a notification, is mixed and transmitted to an external device (e.g., a wireless audio output device), it is difficult for a user to hear the sound of the second hand through the speaker of the smart watch.

Aspects of the disclosure are to address at least the above-mentioned problems and/or disadvantages and to provide at least the advantages described below. Accordingly, an aspect of the disclosure is to provide a wearable electronic device to allow an audio signal to be output through a speaker or to be output through an external device according to whether the external device is connected.

Additional aspects will be set forth in part in the description which follows and, in part, will be apparent from the description, or may be learned by practice of the presented embodiments.

Solution to Problem

In accordance with an aspect of the disclosure, a wearable electronic device is provided. The electronic device includes a wireless communication circuit, a first audio mixer, a second audio mixer, a first audio output interface, a second audio output interface, a speaker, and a processor configured to be operatively connected to the wireless communication circuit, the first audio mixer, the second audio mixer, the first audio output interface, the second audio output interface, and the speaker, wherein the processor may be configured to detect output of a plurality of audio signals including a first audio signal having a first property in a state of being connected to an external device through the wireless communication circuit, transmit the first audio signal having the first property to the first audio mixer, transmit remaining audio signals other than the first audio signal having the first property among the plurality of audio signals to the second audio mixer, transmit the first audio signal to the first audio output interface to output the first audio signal through the speaker, and synthesize the remaining audio signals into a second audio signal using the second audio mixer and transmit the synthesized second audio signal to the second audio output interface to output the second audio signal through the external device.

In accordance with another aspect of the disclosure, an audio signal processing method of a wearable electronic device is provided. The method includes detecting output of a plurality of audio signals including a first audio signal having a first property in a state of being connected to an external device through a wireless communication circuit, transmitting the first audio signal having the first property to a first audio mixer, transmitting remaining audio signals other than the first audio signal having the first property among the plurality of audio signals to a second audio mixer, transmitting the first audio signal to a first audio output interface to output the first audio signal through a speaker, and synthesizing the remaining audio signals into a second audio signal using the second audio mixer and transmitting the synthesized second audio signal to a second audio output interface to output the second audio signal through the external device.

Advantageous Effects of Invention

A wearable electronic device according to various embodiments of the disclosure may allow an audio signal processed using a first audio mixer to be output through a speaker regardless of whether an external device is connected. Further, the wearable electronic device may allow an audio signal processed using a second audio mixer to be output through a speaker or may change only a path so that the audio signal is output through the external device according to whether the external device is connected. Accordingly, it is possible to provide a consistent user experience (UX) wherein the audio signal processed using the first audio mixer is output through the speaker regardless of whether the external device is connected.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 4 is a flowchart illustrating a method for processing a plurality of audio signals when an external device is connected to a wearable electronic device according to an embodiment of the disclosure; and FIG. 5 is a flowchart illustrating a method for processing a plurality of audio signals when an external device is disconnected from a wearable electronic device according to an embodiment of the disclosure.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
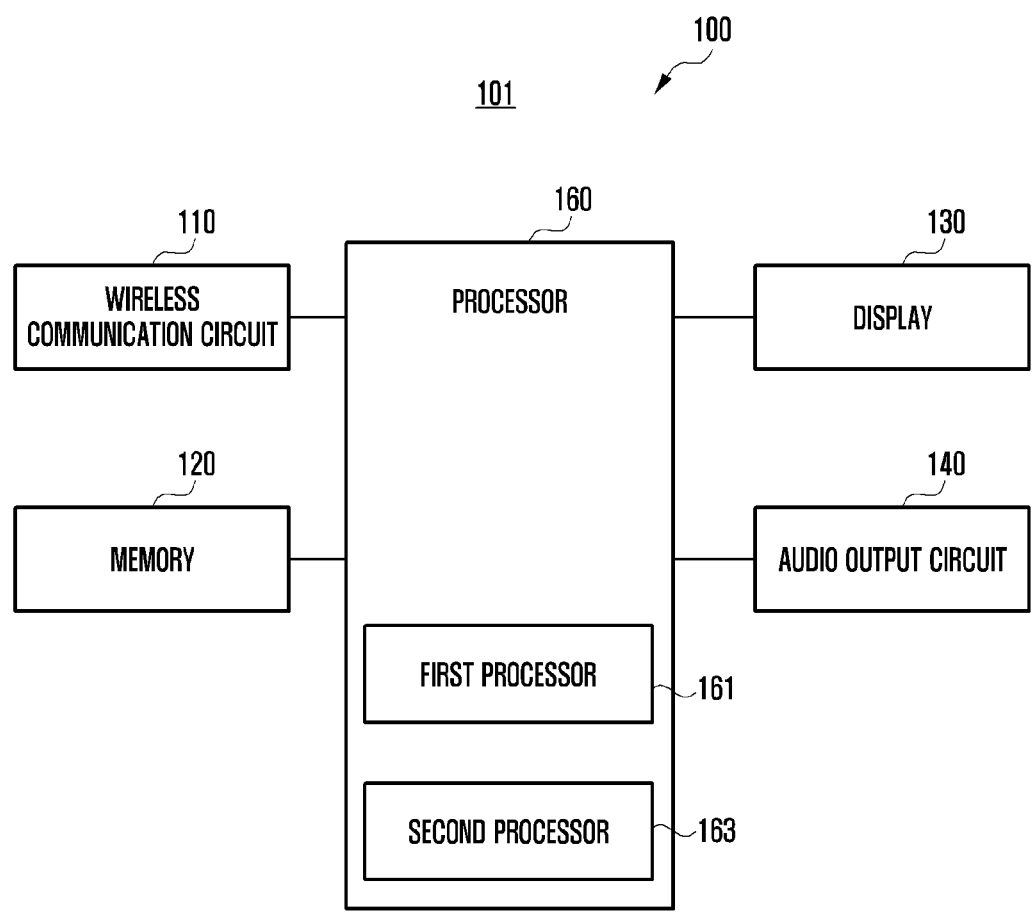
FIG. 1A is a block diagram illustrating a wearable electronic device according to an embodiment of the disclosure.

FIG. 1A is a block diagram illustrating a wearable electronic device according to an embodiment of the disclosure.

Figure 1B:
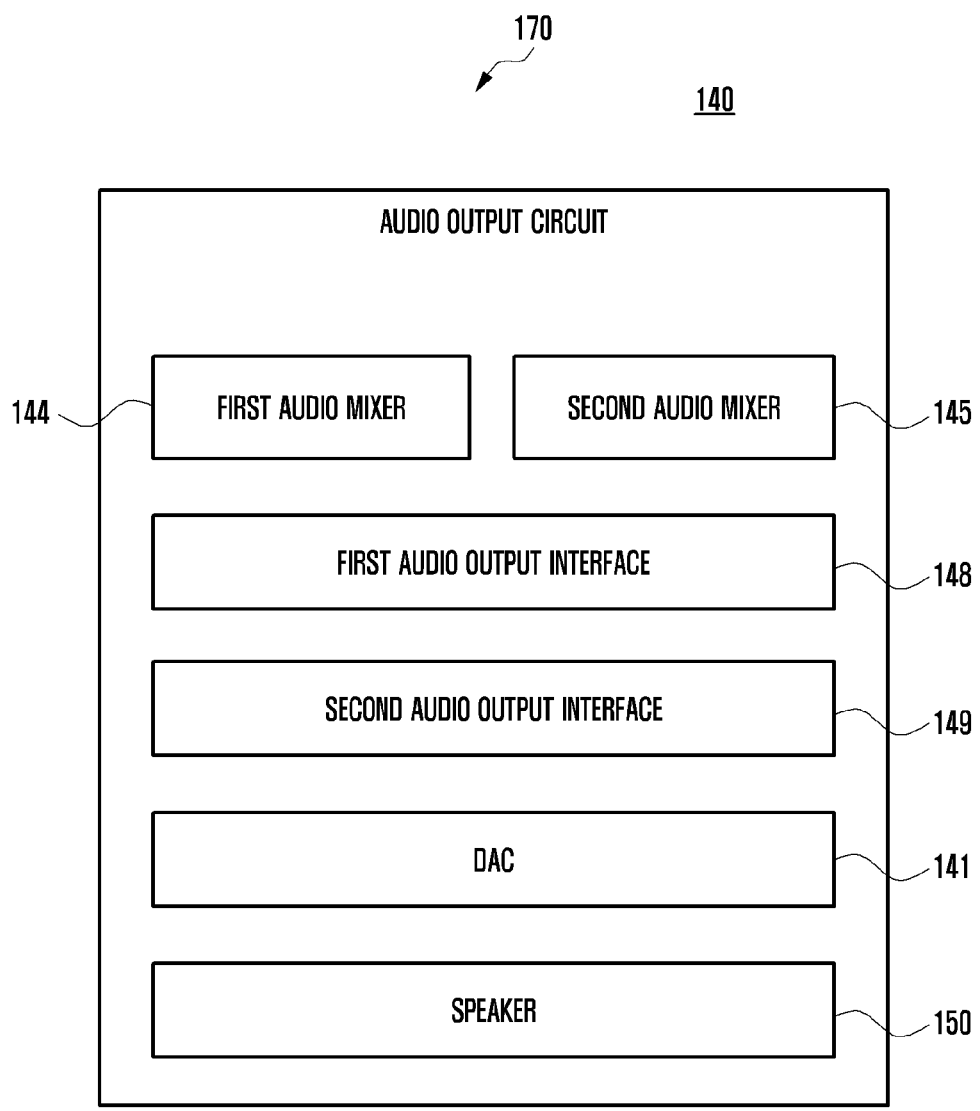
FIG. 1B is a block diagram illustrating an audio output circuit according to an embodiment of the disclosure.

FIG. 1B is a block diagram illustrating an audio output circuit according to an embodiment of the disclosure.

Referring to FIGS. 1A and 1B, in block diagrams 100 and 170, a wearable electronic device 101 may include a wireless communication circuit 110, a memory 120, a display 130, an audio output circuit 140, and/or a processor 160.

In certain embodiments, the wireless communication circuit 110 may support establishing a wireless communication channel between the wearable electronic device 101 and an external device (e.g., a wireless audio output device, a wireless speaker, or a wireless headset), and performing communication through the established communication channel. The wireless communication circuit 110 may support a short-range communication network, such as Bluetooth™, Wireless Fidelity (Wi-Fi) Direct, or Infrared Data Association (IrDA). Although not limited thereto, the wireless communication circuit 110 may support a long-range network, such as a legacy cellular network, a fifth generation (5G) network, a next-generation communication network, Internet, or a computer network (e.g., a local area network (LAN) or wide area network (WAN)).

In certain embodiments, the memory 120 may function to store a program for processing and control of the processor 160 of the wearable electronic device 101, an operating system (OS), various applications, and/or input/output data, and may store a program for controlling an overall operation of the wearable electronic device 101. The memory 120 may store various pieces of configuration information required when the wearable electronic device 101 processes functions related to various embodiments of the disclosure.

In an embodiment, the memory 120 may store one or more instructions related to configuration of an output path for outputting an audio signal, based on property information about an audio signal requested to be output and/or whether an external device (e.g., a wireless audio output device) is connected through the wireless communication circuit 110. The memory 120 may store one or more instructions for processing an audio signal, based on the configured output path for outputting the audio signal.

In certain embodiments, the display 130 may display an image under control of the processor 160, and may be configured as any one of a liquid crystal display (LCD), a light-emitting diode (LED) display, an organic light-emitting diode (OLED) display, a microelectromechanical systems (MEMS) display, an electronic paper display, or a flexible display. However, the display 130 is not limited thereto.

In certain embodiments, the display 130 may visually provide various pieces of information to the outside (e.g., a user) of the wearable electronic device 101 under control of the processor 160. The display 130 may include a touch sensor configured to detect a touch, or a pressure sensor configured to measure the strength of a force generated by the touch.

In an embodiment, the display 130 may display a user interface related to a watch function under control of the processor 160. The display 130 may display a user interface that allows the user to control a function related to audio playback under control of the processor 160.

In certain embodiments, the audio output circuit 140 may include a digital-to-analog converter (DAC) 141, a first audio mixer 144, a second audio mixer 145, a first audio output interface 148, a second audio output interface 149, and/or a speaker 150.

In certain embodiments, each component shown in FIG. 1B may be configured as software, and/or may be configured as hardware. In an embodiment, the components shown in FIG. 1B are conceptually illustrated, and may be disposed as separate modules.

In an embodiment, when at least two audio signals requested to be output are received, the first audio mixer 144 may be configured as software (e.g., at least one instruction) to synthesize the received at least two audio signals and transmit the same to an audio output interface (e.g., the first audio output interface 148).

In an embodiment, the second audio mixer 145 may include a sample rate converter (SRC). When at least two audio signals requested to be output are received, the second audio mixer 145 may synthesize the at least two audio signals using the same rate converter, based on a format (e.g., a sample rate and/or a bit width) of the received at least two audio signals. The second audio mixer 145 may transmit a synthesized audio signal to an audio output interface (e.g., the first audio output interface 148 or the second audio output interface 149). The second audio mixer 145 may be configured as a hardware module. Although not limited thereto, the second audio mixer 145 may be configured as software.

In an embodiment, the first audio output interface 148 may transmit a digital audio signal to the DAC 141. The DAC 141 may convert the digital audio signal received from the first audio output interface 148 into an analog audio signal, and may transmit the converted analog audio signal to the speaker 150.

In an embodiment, the second audio output interface 149 may transmit a digital audio signal to an external device (e.g., a wireless audio output device) connected wirelessly (e.g., via Bluetooth™ communication) through the wireless communication circuit 110.

In certain embodiments, the first audio output interface 148 and the second audio output interface 149 may be configured as hardware modules, and a format to be used may be configured among formats supported by each audio output interface.

In certain embodiments, although not shown, the wearable electronic device 101 may further include an audio input circuit (e.g., an analog-to-digital converter (ADC), an audio input mixer, an audio input interface, and/or an audio input device).

In certain embodiments, the processor 160 may include, for example, a microcontroller unit (MCU), and may control a plurality of hardware components connected to the processor 160 by running the operating system (OS) or an embedded software program. The processor 160 may control the plurality of hardware components, for example, according to the instructions stored in the memory 120.

In certain embodiments, the processor 160 may include a first processor 161 and a second processor 163 operable independently of or together with the first processor 161. The first processor 161 may include a main processor, for example, a central processing unit or an application processor. The second processor 163 may include a graphic processing unit, a neural processing unit (NPU), an image signal processor, a sensor hub processor, a communication processor, or a dedicated intellectual property (IP) for processing an audio signal.

In certain embodiments, when the wearable electronic device 101 includes the first processor 161 (e.g., a main processor) and the second processor 163 (e.g., an auxiliary processor), the second processor 163 may be configured to use less power than the first processor 161 or to be specialized in a specified function.

In certain embodiments, the first processor 161 and the second processor 163 may be configured as a single chip (e.g., a system-on-chip (SoC)). However, the disclosure is not limited thereto. In another embodiment, the first processor 161 and the second processor 163 may be configured separately. In still another embodiment, the second processor 163 may be included in another module (e.g., the wireless communication circuit 110 or the audio output circuit 140).

In an embodiment, the processor 160 (e.g., the first processor 161) may detect (or identify) output of a plurality of audio signals including a first audio signal having a first property in a state of being connected to an external device (e.g., a wireless audio output device) through the wireless communication circuit 110. Each of the plurality of audio signals may have the first property or a second property. The first property and the second property may be information related to a device supporting output of each audio signal. For example, the first property may include information for supporting output of an audio signal through the speaker 150, and the second property may include information for supporting output of an audio signal through the speaker 150 and the external device.

In an embodiment, an audio signal having the first property may include, for example, an audio signal, such as a clock sound (e.g., a sound of a second hand). However, the disclosure is not limited thereto. For example, the audio signal having the first property may include a sound corresponding to a specific function (or a specific application) of the wearable electronic device 101, a sound, such as a system operation sound, and/or a sound of an application designated by a user (e.g., an application designated by the user to output an audio signal through the speaker).

In an embodiment, an audio signal having the second property may include, for example, an audio signal, such as a media sound (e.g., a video sound or a music sound), a notification sound, and/or a ringtone sound.

In certain embodiments, although the audio signals are described as being divided into audio signals having the first property and audio signals having the second property, the disclosure is not limited thereto. For example, an audio signal not having the first property may be defined as having the second property.

In an embodiment, the processor 160 (e.g., the first processor 161) may configure a path for outputting each audio signal, based on property information about each of the plurality of audio signals and/or state information about whether the external device is connected. The processor 160 (e.g., the second processor 163) may transmit the first audio signal having the first property to the first audio mixer 144, based on the path for outputting each audio signal, and may transmit remaining audio signals (e.g., audio signals having the second property) other than the first audio signal having the first property among the plurality of audio signals to the second audio mixer 145.

In an embodiment, the processor 160 (e.g., the second processor 163) may transmit the first audio signal transmitted by the first audio mixer 144 to the first audio output interface 148 to output the first audio signal through the speaker 150. For example, the first audio signal transmitted to the first audio output interface 148 may be a digital audio signal, and the processor 160 (e.g., the second processor 163) may convert the first audio signal, which is the digital audio signal, into an analog audio signal through the DAC 141, and may transmit the first audio signal, which is converted into the analog audio signal, to the first audio output interface 148.

In an embodiment, the processor 160 (e.g., the second processor 163) may synthesize the remaining audio signals into a second audio signal using the second audio mixer 145, and may transmit the synthesized second audio signal to the second audio output interface 149 to output the second audio signal through the external device. For example, the second audio signal transmitted to the second audio output interface 149 may be a digital audio signal.

In an embodiment, the processor 160 (e.g., the first processor 161) may detect (or identify) disconnection of the external device. Upon detecting that the external device is disconnected, the processor 160 (e.g., the first processor 161) may change the path for outputting the plurality of audio signals. For example, the processor 160 (e.g., the first processor 161) may maintain an output path of the first audio signal having the first property as an output path for output through the speaker 150. The processor 160 (e.g., the first processor 161) may change the output path of the audio signals having the second property to the output path for output through the speaker 150.

In an embodiment, the processor 160 (e.g., the second processor 163) may transmit the second audio signal synthesized using the second audio mixer 145 to the first audio mixer 144. The processor 160 (e.g., the second processor 163) may synthesize the first audio signal (e.g., the audio signal having the first property) and the second audio signal (e.g., the audio signal having the second property) into a third audio signal using the first audio mixer 144, and may transmit the synthesized third audio signal to the first audio output interface 148 to output the third audio signal through the speaker 150. For example, the third audio signal transmitted to the first audio output interface 148 may be a digital audio signal, and the processor 160 (e.g., the second processor 163) may convert the third audio signal, which is the digital audio signal, into an analog audio signal through the DAC 141, and may transmit the third audio signal, which is converted into the analog audio signal, to the first audio output interface 148.

The wearable electronic device 101 according to various embodiments may include the wireless communication circuit 110, the first audio mixer 144, the second audio mixer 145, the first audio output interface 148, the second audio output interface 149, the speaker 150, and the processor 160 configured to be operatively connected to the wireless communication circuit 110, the first audio mixer 144, the second audio mixer 145, the first audio output interface 148, the second audio output interface 149, and the speaker 150, wherein the processor 160 may be configured to detect output of a plurality of audio signals including a first audio signal having a first property in a state of being connected to an external device through the wireless communication circuit 110, transmit the first audio signal having the first property to the first audio mixer 144, transmit remaining audio signals other than the first audio signal having the first property among the plurality of audio signals to the second audio mixer 145, transmit the first audio signal to the first audio output interface 148 to output the first audio signal through the speaker 150, and synthesize the remaining audio signals into a second audio signal using the second audio mixer 145 and transmit the synthesized second audio signal to the second audio output interface 149 to output the second audio signal through the external device.

In various embodiments, the remaining audio signals may have a second property.

In various embodiments, the first property and the second property may include information related to a device supporting output of each of the plurality of audio signals.

In various embodiments, the first property may include information for supporting output of an audio signal through the speaker 150, and the second property may include information for supporting output of an audio signal through the speaker 150 and the external device.

In various embodiments, the processor 160 may include the first processor 161 and the second processor 163, and the first processor 161 may be configured to transmit the first audio signal having the first property to the first audio mixer 144, and transmit the remaining audio signals to the second audio mixer 145.

In various embodiments, the first processor 161 may be configured to configure an output path of each audio signal, based on property information about the plurality of audio signals, and transmit the configured output path of each audio signal to the second processor 163.

In various embodiments, the second processor 163 may be configured to transmit the first audio signal to the first audio output interface 148, based on the output path of each audio signal received from the first processor 161, and transmit the second audio signal synthesized using the second audio mixer 145 to the second audio output interface 149.

In various embodiments, the processor 160 may be configured to maintain an output path of the first audio signal having the first property when detecting that the external device is disconnected, and change an output path of the remaining audio signals.

In various embodiments, the processor 160 may be configured to transmit the second audio signal synthesized using the second audio mixer 145 to the first audio mixer 144 when detecting that the external device is disconnected, synthesize the first audio signal and the second audio signal into a third audio signal using the first audio mixer 144, and transmit the synthesized third audio signal to the first audio output interface 148 to output the third audio signal through the speaker 150.

In various embodiments, the first audio signal may include a sound of a second hand, and the remaining audio signals may include a media sound, a notification sound, and/or a ringtone sound.

Figure 2:
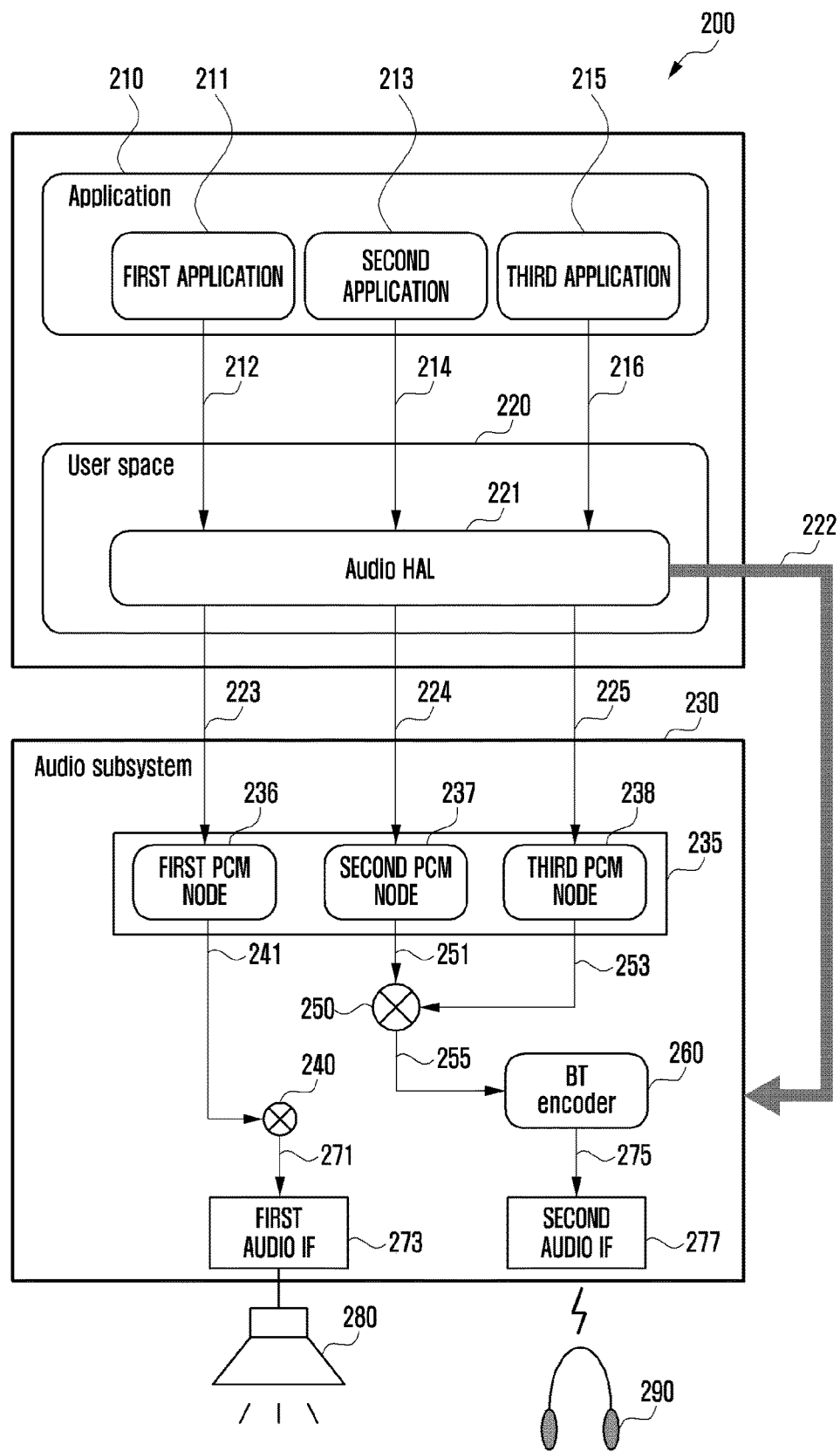
FIG. 2 illustrates a signal flow for processing a plurality of audio signals when an external device is connected to a wearable electronic device according to an embodiment of the disclosure.

FIG. 2 is a diagram illustrating a signal flow for processing a plurality of audio signals when an external device is connected to a wearable electronic device according to an embodiment of the disclosure.

Referring to FIG. 2, in a diagram 200, an application 210, a user space 220, and/or an audio subsystem 230 may be configured on a processor (e.g., the processor 160 of FIG. 1A). In an embodiment, the processor 160 may include a first processor (e.g., the first processor 161 of FIG. 1A) and a second processor (e.g., the second processor 163 of FIG. 1A).

In an embodiment, the first processor 161 may include an application processor (AP). The second processor 163 is a dedicated intellectual property (IP) for processing an audio signal, and may include a processor driven with low power.

Operations of the application 210 and the user space 220 according to various embodiments may be performed by the first processor 161, and operations of the audio subsystem 230 may be performed by the second processor 163. In various embodiments, an operation of processing an audio signal may be performed through the second processor 163 driven with low power, thereby reducing current consumption.

In certain embodiments, the application 210 may be loaded by the processor 160 (e.g., the first processor 161) when an input signal to execute the application 210 occurs according to a user input to execute an application and/or reception of an event (e.g., reception of an event, such as reception of a phone call, reception of a message, and/or reception of an email).

In certain embodiments, the application 210 may include at least one application executable by the processor 160. For example, the application 210 may include a first application 211, a second application 213, and/or a third application 215. In an embodiment, the first application 211, the second application 213, and the third application 215 may be applications related to an audio signal.

Various embodiments of the disclosure are described assuming that the first application 211 is an application (e.g., a watch application) for outputting a clock sound (e.g., a sound of a second hand), the second application 213 is a media player application, and the third application 215 is a notification application.

In an embodiment, the user space 220 may refer to an abstracted layer between hardware (e.g., a speaker 280 (e.g., the speaker 150 in FIG. 1B)) and software (e.g., the application 210). The user space 220 may include an audio hardware abstraction layer (HAL) 221.

In an embodiment, each application (e.g., the first application 211, the second application 213, and the third application 215) may transmit (e.g., along lines 212, 214, 216) an audio signal (e.g., a first audio signal, a second audio signal, and a third audio signal) to be output to the audio HAL 221 of the user space 220. For example, the first audio signal, the second audio signal, and the third audio signal requested to be output by the respective applications may be digital audio signals.

In an embodiment, the audio HAL 221 may implement (e.g., configure) an interface (e.g., an audio output path) allowing access to an audio device driver (not shown) of the wearable electronic device 101 and hardware (e.g., the speaker 280 and/or an external device 290 (e.g., a wireless audio output device)) connected through a wireless communication circuit (e.g., the wireless communication circuit 110 of FIG. 1A). For example, the audio HAL 221 may determine an audio output device (e.g., the speaker 280 and/or the external device 290) to which an audio signal requested to be output by the application 210 is output, based on property information about each audio signal and/or state information about whether the external device 290 (e.g., the wireless audio output device) is connected. The audio HAL 221 may implement an interface (e.g., an audio output path) allowing access to the determined audio output device.

In an embodiment, the property information about each audio signal (e.g., the first audio signal, the second audio signal, and the third audio signal) may include information about whether each audio signal supports output to the speaker 280 and/or the external device 290 (e.g., the wireless audio output device).

For example, the first audio signal, such as a clock sound (e.g., a sound of a second hand), requested to be output by the first application 211 may support only output to the speaker 280. In another example, the second audio signal, such as media, requested to be output by the second application 213 and/or the third audio signal (e.g., a notification sound or a ringtone sound), such as a notification, requested to be output by the third application 215 may support output to the speaker 280 and the external device 290.

Hereinafter, in various embodiments of the disclosure, when an audio signal supports only output to the speaker 280 (e.g., when the audio signal is a speaker-only audio signal), the audio signal is described as having a first property, and when an audio signal supports output to the speaker 280 and the external device 290, the audio signal is described as having a second property.

As described above, the first audio signal requested to be output by the first application 211 supports only output to the speaker 280, and may thus have the first property. The second audio signal output requested by the second application 213 and the third audio signal output requested by the third application 215 support output to the speaker 280 and the external device 290, and may thus have the second property.

In an embodiment, each application (e.g., the first application 211, the second application 213, and the third application 215) may transmit the property information (e.g., the first property or the second property) about the audio signal along with a request to output the audio signal (e.g., the first audio signal, the second audio signal, and the third audio signal) to the audio HAL 221 of the user space 220. For example, each application may transmit tag information including the property information (e.g., the first property (e.g., speaker-only) or the second property) about the audio signal in addition to the request to output the audio signal to the audio HAL 221 of the user space 220.

In an embodiment, the audio HAL 221 may implement the interface (e.g., configure a path for outputting each audio signal) allowing access to the audio output device (e.g., the speaker 280 or the external device 290), based on the property information about the audio signal received from each application (e.g., the first application 211, the second application 213, and the third application 215) and the state information about whether the external device 290 (e.g., the wireless audio output device) is connected.

In an embodiment, the audio HAL 221 may transmit (e.g., along line 222) information including the audio output path for outputting the audio signal to the audio subsystem 230.

In certain embodiments, the audio subsystem 230 may include a pulse code modulation (pcm) node 235, a first audio mixer 240 (e.g., the first audio mixer 144 of FIG. 1B), a second audio mixer 250 (e.g., the second audio mixer 145 of FIG. 1B), and/or a Bluetooth™ (BT) encoder 260.

In certain embodiments, the pcm node 235 may be a buffer that transmits (or stores) an audio signal between the application 210 operating by the first processor 161 and the user space 220 and the audio subsystem 230.

In certain embodiments, the first audio mixer 240 may be configured as software.

In certain embodiments, the second audio mixer 250 may be configured as a hardware module. The disclosure is not limited thereto, and the second audio mixer 250 may be configured as software.

In certain embodiments, an audio output interface (e.g., a first audio output interface 273 (e.g., the first audio output interface 148 of FIG. 1B) or a second audio output interface 277 (e.g., the second audio output interface 149 of FIG. 1B)) may support connection between the audio subsystem 230 and the audio output device (e.g., the speaker 280 and the external device 290 (e.g., the wireless audio output device)).

In an embodiment, the audio HAL 221 may transmit the audio signal requested to be output by the application 210 to the pcm node 235 of the audio subsystem 230. The pcm node 235 may include a first pcm node 236, a second pcm node 237, and/or a third pcm node 238. The disclosure is not limited thereto, and the pcm node 235 may include more than three pcm nodes.

In an embodiment, one pcm node among a plurality of pcm nodes may be preset as a pcm node that stores (e.g., transmits) an audio signal supporting only output to the speaker 280 of the wearable electronic device 101.

The pcm node that stores the audio signal supporting only output to the speaker 280 (e.g., an audio signal having the first property) according to various embodiments of the disclosure is assumed as the first pcm node 236 in a description. In an embodiment, the first pcm node 236 may be connected to the first audio mixer 240 (e.g., the first audio mixer 144 of FIG. 1B). The first audio mixer 240 may be connected to the first audio output interface 273 (e.g., the first audio output interface 148 of FIG. 1B) supporting output of an audio signal through the speaker 280.

In an embodiment, the audio HAL 221 may transmit the first audio signal having the first property requested to be output (or the first audio signal having the first property among a plurality of audio signals (e.g., the first audio signal, the second audio signal, and the third audio signal) requested to be output) to the first pcm node 236 among the pcm nodes 236, 237, and 238.

In an embodiment, the audio HAL 221 may transmit (e.g., along line 224) the second audio signal having the second property requested to be output by the second application 213 to the second pcm node 237. The audio HAL 221 may transmit (e.g., along line 225) the third audio signal having the second property requested to be output by the third application 215 to the third pcm node 238. Although the second audio signal having the second property requested to be output is described as being transmitted (e.g., along line 224) to the second pcm node 237, the disclosure is not limited thereto. For example, when the tag information received together with the second audio signal (or the third audio signal) requested to be output does not include first property information, the audio HAL 221 may determine that the second audio signal (or the third audio signal) requested to be output has the second property, and may transmit (e.g., along line 224) the second audio signal (or the third audio signal) to the second pcm node 237.

In an embodiment, the first pcm node 236 may receive the first audio signal having the first property to be output through the speaker 280, and may transmit (e.g., along line 241) the first audio signal to the first audio mixer 240. The second pcm node 237 and the third pcm node 238 may transmit (e.g., along lines 251 and 253) the second audio signal (e.g., the second audio signal requested to be output by the second application 213) and the third audio signal (e.g., the third audio signal requested to be output by the third application 215) which have the second property to the second audio mixer 250. The second audio mixer 250 may synthesize (e.g., mix) the second audio signal and the third audio signal into a fourth audio signal. For example, the second audio mixer 250 may include a sample rate converter (SRC). The second audio mixer 250 may synthesize the second audio signal and the third audio signal into the fourth audio signal using the sample rate converter, based on a format of the second audio signal and a format of the third audio signal. A format of an audio signal may include a sampling rate and/or a bit width of the audio signal.

In an embodiment, the audio subsystem 230 may transmit the audio signal (e.g., the first audio signal, the second audio signal, and the third audio signal) transmitted through the pcm node 235 to the first audio output interface 273 or the second audio output interface 277, based on the information including the audio output path received through the audio HAL 221.

For example, the audio subsystem 230 may transmit (e.g., along line 271) the first audio signal transmitted to the first audio mixer 240 to the first audio output interface 273 supporting output to the speaker 280 of the wearable electronic device 401, based on the information including the audio output path received from the audio HAL 221. The audio subsystem 230 may transmit (e.g., alone line 255) the fourth audio signal synthesized by the second audio mixer 250 to the BT encoder 260, based on the information including the audio output path received from the audio HAL 221. The audio subsystem 230 may encode the fourth audio signal using the BT encoder 260, based on a Bluetooth™ protocol, and may transmit (e.g., along line 275) the encoded fourth audio signal to the second audio output interface 277 supporting output to the external device 290.

In certain embodiments, when output of the first audio signal having the first property is requested (or output of the plurality of audio signals (e.g., the first audio signal, the second audio signal, and the third audio signal) including the first audio signal having the first property is requested), the processor 160 may transmit (e.g., along lines 223, 241, and 271) the first audio signal having the first property to the first audio mixer 240 and the first audio output interface 273 through the first pcm node 236 among the pcm nodes 236, 237, and 238, thus outputting the audio signal having the first property through the speaker 280 regardless of whether the external device 290 is connected. The audio signals having the second property among the plurality of audio signals may be synthesized by the second audio mixer 250, and may be transmitted to the first audio output interface 273 or the second audio output interface 277 depending on whether the external device 290 is connected, thus being output through the speaker 280 or the external device 290.

Referring to FIG. 2, an audio signal having the first property (e.g., the first audio signal) and an audio signals having the second property (e.g., the second audio signal and the third audio signal) (or an audio signal having no first property) may be processed using different audio mixers (e.g., the first audio mixer 240 and the second audio mixer 250). The audio signal having the first property (e.g., the first audio signal) processed using the first audio mixer 240 may be output through the speaker 280. In an embodiment, the first audio output interface 273 may transmit the audio signal having the first property (e.g., the first audio signal), which is a digital audio signal, to a DAC (e.g., the DAC 141 of FIG. 1B). The DAC 141 may convert the audio signal having the first property (e.g., the first audio signal), which is the digital audio signal, into an analog audio signal. The DAC 141 may transmit the audio signal having the first property (e.g., the first audio signal), which is converted into the analog audio signal, to the speaker 280.

In an embodiment, an audio signal having the second property processed using the second audio mixer 250 (e.g., the fourth audio signal) may be output through the external device 290 wirelessly (e.g., Bluetooth™ communication) connected through the wireless communication circuit 110. In an embodiment, the second audio output interface 277 may transmit the fourth audio signal having the second property, which is a digital audio signal, to the external device 290 wirelessly (e.g., Bluetooth™ communication) connected through the wireless communication circuit 110.

In various embodiments of the disclosure, processing the audio signal having the first property (e.g., a sound of a second hand) and the audio signal having the second property (e.g., media and/or a notification) respectively using different audio mixers allows the audio signal having the first property (e.g., the sound of the second hand) having a relatively low sound to be output through the speaker 280 regardless of output of the audio signal having the second property (e.g., the media and/or notification), thus providing a user with a user experience related to a function of an analog watch.

Figure 3:
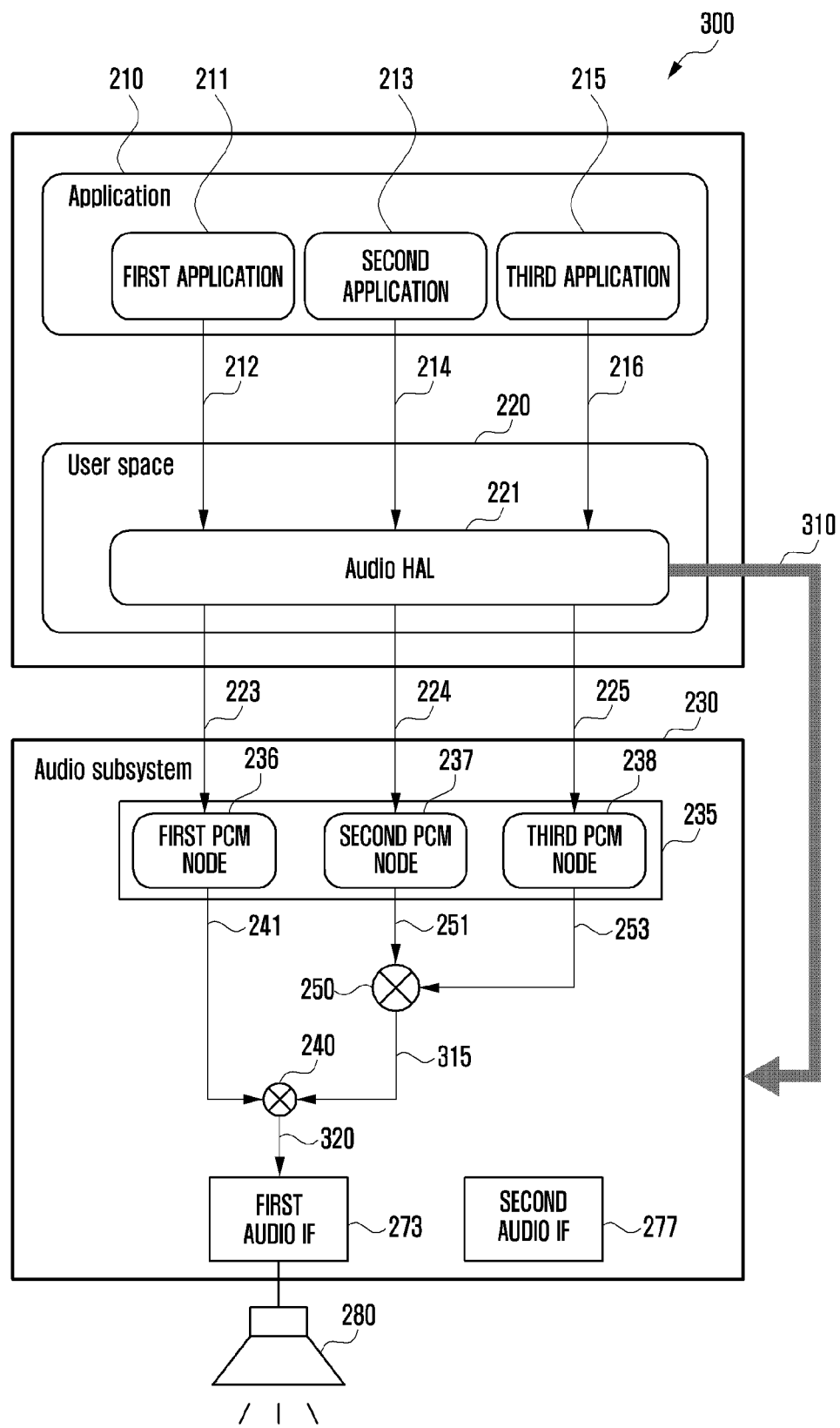
FIG. 3 illustrates a signal flow for processing a plurality of audio signals when an external device is disconnected from a wearable electronic device according to an embodiment of the disclosure.

FIG. 3 is a diagram illustrating a signal flow for processing a plurality of audio signals when an external device is disconnected from a wearable electronic device according to an embodiment of the disclosure.

FIG. 3 according to various embodiments illustrates a method for processing the plurality of audio signals (e.g., the first audio signal, the second audio signal, and the third audio signal) described above in FIG. 2, based on disconnection of the external device 290 while outputting the plurality of audio signals through different audio output devices, for example, a speaker 280 and the external device 290.

In FIG. 3, the same reference numerals are given to components substantially the same as those of FIG. 2, and a detailed description thereof may be omitted.

Referring to FIG. 3, in a diagram 300, the first audio signal requested to be output by a first application 211 according to the embodiments of FIG. 2 may be in a state of being output through a speaker 280, and the fourth audio signal into which the second audio signal and the third audio signal requested to be output by a second application 213 and a third application 215 are synthesized may be in a state of being output through the external device 290 (e.g., a wireless audio output device) connected through a wireless communication circuit (e.g., the wireless communication circuit 110).

In an embodiment, a processor (e.g., the processor 160 of FIG. 1A) (e.g., the first processor 161 of FIG. 1A) of the wearable electronic device (e.g., the wearable electronic device 101 of FIG. 1A) may detect that communication with the external device 290 wirelessly (e.g., Bluetooth™ communication) connected is disconnected.

In an embodiment, the processor 160 (e.g., the first processor 161) (or the audio HAL 221) may maintain an audio output path for outputting the first audio signal having the first property requested to be output by the first application 211 and may change an audio output path for outputting the second audio signal and the third audio signal having the second property requested to be output by the second application 213 and the third application 215, based on the communication with the external device 290 being disconnected.

For example, as described above in FIG. 2, when an audio signal has the first property, the audio signal supports only output to the speaker 280, and thus the processor 160 (e.g., the first processor 161) (or the audio HAL 221) may maintain the existing audio output path as an audio output path for outputting the audio signal having the first property so that the audio signal having the first property is output through the speaker 280. When an audio signal has the second property (or does not have the first property), the processor 160 (e.g., the first processor 161) (or the audio HAL 221) may change the audio output path so that the audio signal having the second property is output through the speaker 280 instead of the external device 290, based on disconnection of the external device 290.

In certain embodiments, the audio HAL 221 may transmit (e.g., along line 310) information including a path for outputting each configured audio signal (e.g., the first audio signal, the second audio signal, and the third audio signal) to the audio subsystem 230.

In an embodiment, the audio subsystem 230 (e.g., the second processor 163 of FIG. 1A) may transmit (e.g., along line 315) the fourth audio signal synthesized using the second audio mixer 250 to the first audio mixer 240, based on the information including the path for outputting each audio signal received from the audio HAL 221.

In an embodiment, the first audio mixer 240 may synthesize the first audio signal and the fourth audio signal into a fifth audio signal, and may transmit (e.g., along line 320) the synthesized fifth audio signal to the first audio output interface 273 supporting output to the speaker 280.

In an embodiment, the fifth audio signal received by the first audio output interface 273 may be a digital audio signal. The first audio output interface 273 may transmit the fifth audio signal (e.g., the first audio signal), which is the digital audio signal, to a DAC (e.g., the DAC 141 of FIG. 1B). The DAC 141 may convert the fifth audio signal, which is the digital audio signal, into an analog audio signal. The DAC 141 may transmit the fifth audio signal converted into the analog audio signal to the speaker 280.

Referring to FIG. 3, an audio signal having the first property (e.g., the first audio signal) and an audio signal having the second property (e.g., the second audio signal and the third audio signal) may be processed using different audio mixers (e.g., the first audio mixer 240 and the second audio mixer 250) and may be output through the speaker 280. Accordingly, the audio signal having the first property of a relatively low sound may be output through the speaker 280 without experiencing interference by the audio signal having the second property.

FIG. 4 is a flowchart illustrating a method for processing a plurality of audio signals when an external device is connected to a wearable electronic device according to an embodiment of the disclosure.

Referring to FIG. 4, in a flowchart 400, in operation 410, a processor (e.g., the processor 160 of FIG. 1A) (e.g., the first processor 161 of FIG. 1A) of the wearable electronic device (e.g., the wearable electronic device 101 of FIG. 1A) may detect output of a plurality of audio signals including a first audio signal having a first property in a state of being connected to an external device (e.g., the external device 290 of FIGS. 2 and 3). For example, the plurality of audio signals including the first audio signal may be digital audio signals.

In an embodiment, the external device 290 may include a wireless audio output device connected through a wireless communication circuit (e.g., the wireless communication circuit 110 of FIG. 1A).

In an embodiment, the processor 160 (e.g., the first processor 161) may detect a signal for requesting output of the plurality of audio signals (e.g., a first audio signal, a second audio signal, and a third audio signal) through an application (e.g., the application 210 of FIG. 2) (e.g., the first application 211, the second application 213, and the third application 215).

In certain embodiments, each of the plurality of audio signals may have the first property or a second property. The first property and the second property may be information related to a device supporting output of each audio signal.

In an embodiment, the first property may include information for supporting output of an audio signal through a speaker (e.g., the speaker 150 of FIG. 1B and the speaker 280 of FIGS. 2 and 3). The second property may include information for supporting output of an audio signal through the speaker 280 and the external device 290.

For example, when output of an audio signal having the first property and an audio signal having the second property is requested while the external device 290 is not connected to the wearable electronic device 101, the processor 160 may allow the audio signal having the first property and the audio signal having the second property to be output through the speaker 280. In another example, when connection of the external device 290 to the wearable electronic device 101 is detected, the processor 160 may control the audio signal having the first property to be output through the speaker 280, and may control the audio signal having the second property to be output through the external device 290 instead of the speaker 280.

That is, the audio signal having the first property may be output through the speaker 280 regardless of whether the external device 290 is connected. The audio signal having the second property may be output through the speaker 280 or the external device 290 depending on whether the external device 290 is connected.

In an embodiment, the audio signal having the first property may include, for example, an audio signal (e.g., the first audio signal requested to be output by the first application 211 of FIGS. 2 and 3), such as a clock sound (e.g., a sound of a second hand), a sound corresponding to a specific function (or a specific application) of the wearable electronic device 101, a sound, such as a system operation sound, and/or a sound of an application designated by a user (e.g., an application designated by the user to output an audio signal through the speaker). The audio signal having the second property may include, for example, an audio signal (e.g., the second audio signal requested to be output by the second application 213 of FIGS. 2 and 3 and/or the third audio signal requested to be output by the third application 215), such as a media sound (e.g., a video sound or a music sound), a notification sound, and/or a ringtone sound.

Examples of the audio signals having the first property and the second property according to various embodiments (e.g., the clock sound, the sound corresponding to the specific function, the sound, such as the system operation sound, the sound of the application designated by the user, the media sound, the notification sound, and the ringtone sound) are not limited to the foregoing examples of the audio signals.

Referring to FIG. 2, the application 210 (e.g., the first application 211, the second application 213, and the third application 215) may transmit property information about the audio signal (e.g., the first audio signal, the second audio signal, and the third audio signal), along with a request to output the audio signal, to a user space (e.g., the user space 220 of FIGS. 2 and 3). For example, the application 210 (e.g., the first application 211, the second application 213, and the third application 215) may transmit tag information including the property information (e.g., the first property (e.g., speaker-only) or the second property) about the audio signal (e.g., the first audio signal, the second audio signal, and the third audio signal) in addition to the request to output the audio signal to an audio HAL 221 of the user space 220. The disclosure is not limited thereto, and for example, the application 210 may transmit only the request to output the audio signal to the audio HAL 221 of the user space 220, and may not transmit the tag information. In this case, the audio HAL 221 may determine that the audio signal requested to be output has the second property, and may configure a path for outputting the audio signal requested to be output, which is described later.

In an embodiment, the audio HAL (e.g., the audio HAL 221 of FIGS. 2 and 3) of the user space 220 may implement an interface (e.g., configure a path for outputting each audio signal) allowing access to an audio output device (e.g., the speaker 280 or the external device 290), based on the property information about the audio signal (e.g., the first audio signal, the second audio signal, and the third audio signal) corresponding to each application (e.g., the first application 211, the second application 213, and the third application 215) received from the application 210 and/or state information about whether the external device 290 is connected.

In certain embodiments, the audio HAL 221 may transmit information about the configured path for outputting each audio signal (e.g., the first audio signal, the second audio signal, and the third audio signal) to an audio subsystem (e.g., the audio subsystem 230 of FIGS. 2 and 3).

In an embodiment, the audio HAL 221 may transmit each audio signal to a pcm node (e.g., the pcm node 235 of FIGS. 2 and 3 (e.g., the first pcm node 236, the second pcm node 237, and/or the third pcm node 238)) of the audio subsystem 230. For example, the pcm node 235 may be a buffer that transmits an audio signal between the application 210 operating by the first processor 161 and the user space 220 and the audio subsystem 230 operating by a second processor (e.g., the second processor 163 of FIG. 1A).

In an embodiment, in operation 420, the processor 160 (e.g., the second processor 163) may transmit the first audio signal having the first property to a first audio mixer (e.g., the first audio mixer 144 of FIG. 1B or the first audio mixer 240 of FIGS. 2 and 3). In operation 430, the processor 160 (e.g., the second processor 163) may transmit remaining audio signals other than the first audio signal having the first property among the plurality of audio signals to a second audio mixer (e.g., the second audio mixer 145 of FIG. 1B or the second audio mixer 250 of FIGS. 2 and 3). In an embodiment, the remaining signals other than the first audio signal having the first property among the plurality of audio signals may be audio signals having the second property.

For example, the processor 160 (e.g., the second processor 163) may perform the foregoing operation 420 and operation 430, based on the information about the output path for outputting the audio signal transmitted by the audio HAL 221 and stored in the pcm node 235 (e.g., the first pcm node 236, the second pcm node 237, and/or the third pcm node 238).

Operation 420 and operation 430 according to various embodiments may be performed in parallel.

In an embodiment, in operation 440, the processor 160 (e.g., the second processor 163) may transmit the first audio signal to a first audio output interface (e.g., the first audio output interface 148 of FIG. 1B or the first audio output interface 273 of FIGS. 2 and 3) to output the first audio signal through the speaker 280. For example, the first audio output interface 273 may transmit the first audio signal (e.g., a digital audio signal) received from the first audio mixer 240 to a DAC (e.g., the DAC 141 of FIG. 1B). The DAC 141 may convert the first audio signal into an analog audio signal, and may transmit the first audio signal, converted into the analog audio signal, to the speaker 280.

In an embodiment, in operation 450, the processor 160 (e.g., the second processor 163) may synthesize the remaining audio signals into a second audio signal using the second audio mixer 250, and may transmit the synthesized second audio signal to the second audio output interface (e.g., the second audio output interface 149 of FIG. 1B or the second audio output interface 277 of FIGS. 2 and 3) to output the second audio signal through the external device 290. In an embodiment, the second audio signal into which the remaining audio signals are synthesized may be a digital audio signal. The second audio output interface 277 may transmit the second audio signal (e.g., the digital audio signal) synthesized through the second audio mixer 250 to the external device 290. In an embodiment, the processor 160 (e.g., the second processor 163) may encode the synthesized second audio signal (e.g., the digital audio signal) through an encoder (e.g., the BT encoder 260 of FIG. 2), and may transmit the encoded second audio signal (e.g., the digital audio signal) to the second audio output interface 277 to output the second audio signal through the external device 290.

Operation 440 and operation 450 according to various embodiments may be performed in parallel.

FIG. 5 is a flowchart illustrating a method for processing a plurality of audio signals when an external device is disconnected from a wearable electronic device according to an embodiment of the disclosure.

FIG. 5 according to various embodiments may be an additional operation of FIG. 4 described above.

Referring to FIG. 5, in a flowchart 500, in operation 510, a processor (e.g., the processor 160 of FIG. 1A) (e.g., the first processor 161 of FIG. 1A) of the wearable electronic device (e.g., the wearable electronic device 101 of FIG. 1A) may detect disconnection of an external device (e.g., the external device 290 of FIGS. 2 and 3).

In an embodiment, upon detecting that the external device 290 is disconnected, the processor 160 (e.g., the first processor 161) may change a path for outputting a plurality of audio signals. For example, an audio HAL (e.g., the audio HAL 221 of FIGS. 2 and 3) of a user space (e.g., the user space 220 of FIGS. 2 and 3) may change the path for outputting a plurality of audio signals, based on the disconnection of the external device 290.

Referring to FIG. 2, when an audio signal has a first property, the processor 160 may allow the audio signal having the first property to be output through a speaker (e.g., the speaker 150 of FIG. 1B or the speaker 280 of FIGS. 2 and 3) regardless of whether the external device 290 is connected. For example, the processor 160 (e.g., the first processor 161 or the audio HAL 221) may maintain an output path of a first audio signal having the first property as an output path for output through the speaker 280.

In an embodiment, when an audio signal has the second property, the processor 160 may allow the audio signal having the second property to be output through the speaker 280 instead of being output through the external device 290, based on the disconnection of the external device 290. For example, the processor 160 (e.g., the first processor 161 or the audio HAL 221) may change an output path of the audio signal having the second property to the output path for output through the speaker 280.

In certain embodiments, the audio HAL 221 may transmit information about the configured path for outputting each audio signal (e.g., the first audio signal, a second audio signal, and a third audio signal) to an audio subsystem (e.g., the audio subsystem 230 of FIGS. 2 and 3).

In an embodiment, in operation 520, the processor 160 (e.g., the second processor 163 of FIG. 1A or the audio subsystem 230) may transmit a second audio signal synthesized using a second audio mixer (e.g., the second audio mixer 145 of FIG. 1B or the second audio mixer 250 of FIGS. 2 and 3) to a first audio mixer (e.g., the first audio mixer 144 of FIG. 1B or the first audio mixer 240 of FIGS. 2 and 3).

For example, the processor 160 (e.g., the second processor 163 of FIG. 1A) may transmit the first audio signal to the first audio mixer 240 and may transmit the second audio signal synthesized by the second audio mixer 250 to the first audio mixer 240, based on the information about the path for outputting each audio signal configured by the audio HAL 221 (e.g., information about the output path changed according to the disconnection of the external device 290).

In an embodiment, in operation 530, the processor 160 (e.g., the second processor 163) may synthesize the first audio signal and the second audio signal into a third audio signal using the first audio mixer 240. In operation 540, the processor 160 (e.g., the second processor 163) may transmit the synthesized third audio signal to a first audio output interface (e.g., the first audio output interface 148 of FIG. 1B or the first audio output interface 273 FIGS. 2 and 3) to output the third audio signal through the speaker 280.

In an embodiment, the first audio output interface 273 may transmit the synthesized third audio signal (e.g., a digital audio signal) to a DAC (e.g., the DAC 141 of FIG. 1B). The DAC 141 may convert the third audio signal into an analog audio signal, and may transmit the third audio signal, converted into the analog audio signal, to the speaker 280. The speaker 280 may output the received third audio signal.

In certain embodiments, when the disconnected external device 290 is reconnected to the wearable electronic device 101, the processor 160 may perform operation 420 to operation 440 of FIG. 4 described above. For example, the processor 160 may transmit the audio signal having the first property to the first audio mixer 240 and the first audio output interface 273 to output the audio signal through the speaker 280, and may transmit the audio signal having the second property to the second audio mixer 250 and the second audio output interface (e.g., the second audio output interface 149 of FIG. 1B or the second audio output interface 277 of FIGS. 2 and 3) to output the audio signal through the external device 290.

In various embodiments, although not shown, when a request to output the first audio signal having the first property is not detected and a request to output the second audio signal and the third audio signal having the second property are detected while the external device 290 is not connected, the processor 160 may transmit the second audio signal and the third audio signal to the second audio mixer 250 through the second pcm node 237 and the third pcm node 238. The processor 160 may synthesize the second audio signal and the third audio signal into a fourth audio signal using the second audio mixer 250, and may transmit the synthesized fourth audio signal to the first audio mixer 240 and the first audio output interface 273, thereby outputting the fourth audio signal through the speaker 280. In this case, the first audio mixer 240 may transmit the synthesized fourth audio signal to the first audio output interface 273 by bypassing.

In various embodiments, although not shown, when a request to output the first audio signal having the first property is not detected and a request to output the second audio signal and the third audio signal having the second property are detected while the external device 290 is connected, the processor 160 may transmit the second audio signal and the third audio signal to the second audio mixer 250 through the second pcm node 237 and the third pcm node 238. The processor 160 may synthesize the second audio signal and the third audio signal into a fourth audio signal using the second audio mixer 250, and may transmit the synthesized fourth audio signal to the second audio mixer 250 and the second audio output interface 277, thereby outputting the fourth audio signal through the external device 290.

Referring to FIGS. 4 and 5, the processor 160 may process the audio signal having the first property using the first audio mixer 240, and may process the audio signal having the second property using the second audio mixer 250. The processor 160 may transmit the audio signal having the first property to the first audio output interface 273 connected to the first audio mixer 240 to output the audio signal through the speaker 280 regardless of whether the external device 290 is connected, thereby providing a user with a consistent user experience in relation to output of the audio signal having the first property.

In various embodiments, when the external device 290 is connected or the external device 290 is disconnected, an output path of an audio signal processed using the first audio mixer 240 may be maintained, and only an output path of an audio signal processed using the second audio mixer 250 may be changed, and thus a delay in outputting an audio signal may not occur.

An audio signal processing method of the wearable electronic device 101 according to various embodiments may include detecting output of a plurality of audio signals including a first audio signal having a first property in a state of being connected to the external device 290 through the wireless communication circuit 110, transmitting the first audio signal having the first property to the first audio mixer 240, transmitting remaining audio signals other than the first audio signal having the first property among the plurality of audio signals to the second audio mixer 250, transmitting the first audio signal to the first audio output interface 273 to output the first audio signal through the speaker 280, and synthesizing the remaining audio signals into a second audio signal using the second audio mixer 250 and transmitting the synthesized second audio signal to the second audio output interface 277 to output the second audio signal through the external device 290.

In various embodiments, the remaining audio signals may have a second property.

In various embodiments, the first property and the second property may include information related to a device supporting output of each of the plurality of audio signals.

In various embodiments, the first property may include information for supporting output of an audio signal through the speaker 280, and the second property may include information for supporting output of an audio signal through the speaker 280 and the external device 290.

The audio signal processing method of the wearable electronic device 101 according to various embodiments may further include configuring an output path of each audio signal, based on property information about the plurality of audio signals after detecting the output of the plurality of audio signals.

The audio signal processing method of the wearable electronic device 101 according to various embodiments may include transmitting the first audio signal to the first audio output interface 273, based on the configured output path of each audio signal, and transmitting the second audio signal synthesized using the second audio mixer 250 to the second audio output interface 277.

The audio signal processing method of the wearable electronic device 101 according to various embodiments may further include maintaining an output path of the first audio signal having the first property when detecting that the external device 290 is disconnected, and changing an output path of the remaining audio signals.

In various embodiments, the changing of the output path may include transmitting the second audio signal synthesized using the second audio mixer 250 to the first audio mixer 240 when detecting that the external device 290 is disconnected.

The audio signal processing method of the wearable electronic device 101 according to various embodiments may further include synthesizing the first audio signal and the second audio signal into a third audio signal using the first audio mixer 240, and transmitting the synthesized third audio signal to the first audio output interface 273 to output the third audio signal through the speaker 280.

In various embodiments, the first audio signal may include a sound of a second hand, and the remaining audio signals may include a media sound, a notification sound, and/or a ringtone sound.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
   a wireless communication circuit;
   memory storing one or more computer programs;
   a first audio mixer;
   a second audio mixer;
   a first audio output interface;
   a second audio output interface;
   a speaker; and
   one or more processors operatively connected to the wireless communication circuit, the memory, the first audio mixer, the second audio mixer, the first audio output interface, the second audio output interface, and the speaker,
   wherein the one or more computer programs include computer-executable instructions that, when executed by the one or more processors individually or collectively, cause the wearable electronic device to:
      detect, in a state of being connected to an external device through the wireless communication circuit, an output of a plurality of audio signals corresponding to a plurality of applications executed by the wearable electronic device,
      identify that the plurality of audio signals includes a first audio signal having a first property and remaining audio signals having a second property,
      transmit, to the first audio mixer, the first audio signal having the first property among the plurality of audio signals,
      transmit, to the second audio mixer, the remaining audio signals among the plurality of audio signals having the second property,
      transmit, to the first audio output interface, the first audio signal to output the first audio signal through the speaker,
      synthesize the remaining audio signals into a second audio signal using the second audio mixer, and
      transmit, to the second audio output interface, the second audio signal to output the second audio signal through the external device,
   wherein the first property comprises information for supporting output of an audio signal through the speaker, and
   wherein the second property comprises information for supporting output of an audio signal through the speaker and the external device.

2. The wearable electronic device of claim 1,
   wherein the one or more processors comprises a first processor and a second processor, and
   wherein the one or more computer programs further include computer-executable instructions that, when executed by the one or more processors individually or collectively, cause the first processor to control the wearable electronic device to:
      transmit, to the first audio mixer, the first audio signal having the first property, and
      transmit, to the second audio mixer, the remaining audio signals.

3. The wearable electronic device of claim 2, wherein the one or more computer programs further include computer-executable instructions that, when executed by the one or more processors individually or collectively, cause the first processor to control the wearable electronic device to:

configure an output path of each audio signal; based on a property about the plurality of audio signals, and transmit, to the second processor, the configured output path of each audio signal.

4. The wearable electronic device of claim 3, wherein the one or more computer programs further include computer-executable instructions that, when executed by the one or more processors individually or collectively, cause the second processor to control the wearable electronic device to:

based on the output path of each audio signal received from the first processor, transmit, to the first audio output interface, the first audio signal, and transmit, to the second audio output interface, the second audio signal synthesized using the second audio mixer.

5. The wearable electronic device of claim 1, wherein the one or more computer programs further include computer-executable instructions that, when executed by the one or more processors individually or collectively, cause the wearable electronic device to:

based on detecting that the external device is disconnected, maintain an output path of the first audio signal having the first property, and change an output path of the remaining audio signals.

6. The wearable electronic device of claim 5, wherein the one or more computer programs further include computer-executable instructions that, when executed by the one or more processors individually or collectively, cause the wearable electronic device to:

based on detecting that the external device is disconnected, transmit, to the first audio mixer, the second audio signal synthesized using the second audio mixer, synthesize the first audio signal and the second audio signal into a third audio signal using the first audio mixer, and transmit, to the first audio output interface, the third audio signal to output the third audio signal through the speaker.

7. The wearable electronic device of claim 1, wherein the first audio signal comprises a sound of a second hand, and wherein the remaining audio signals comprise at least one of a media sound, a notification sound, or a ringtone sound.

8. An audio signal processing method performed by a wearable electronic device, the method comprising:

in a state of being connected to an external device through a wireless communication circuit, detecting, by the wearable electronic device, an output of a plurality of audio signals corresponding to a plurality of applications executed by the wearable electronic device;

identifying, by the wearable electronic device, that the plurality of audio signals includes a first audio signal having a first property and remaining audio signals having a second property;

transmitting, by the wearable electronic device to a first audio mixer, the first audio signal having the first property among the plurality of audio signals;

transmitting, by the wearable electronic device to a second audio mixer, the remaining audio signals among the plurality of audio signals having the second property;

transmitting, by the wearable electronic device to a first audio output interface, the first audio signal to output the first audio signal through a speaker;

synthesizing, by the wearable electronic device, the remaining audio signals into a second audio signal using the second audio mixer; and transmitting, by the wearable electronic device to a second audio output interface, the second audio signal to output the second audio signal through the external device, wherein the first property comprises information for supporting output of an audio signal through the speaker, and wherein the second property comprises information for supporting output of an audio signal through the speaker and the external device.

9. The method of claim 8, further comprising:

after detecting the output of the plurality of audio signals, configuring, by the wearable electronic device, an output path of each audio signal based on a property about the plurality of audio signals.

10. The method of claim 9, further comprising:

based on the configured output path of each audio signal, transmitting, by the wearable electronic device to the first audio output interface, the first audio signal; and transmitting, by the wearable electronic device to the second audio output interface, the second audio signal synthesized using the second audio mixer.

11. The method of claim 8, further comprising:

based on detecting that the external device is disconnected, maintaining, by the wearable electronic device, an output path of the first audio signal having the first property; and changing, by the wearable electronic device, an output path of the remaining audio signals.

12. The method of claim 11, wherein the changing of the output path comprises:

based on detecting that the external device is disconnected, transmitting, by the wearable electronic device to the first audio mixer, the second audio signal synthesized using the second audio mixer.

13. The method of claim 12, further comprising:

synthesizing, by the wearable electronic device, the first audio signal and the second audio signal into a third audio signal using the first audio mixer; and transmitting, by the wearable electronic device to the first audio output interface, the third audio signal to output the third audio signal through the speaker.

14. The method of claim 8, wherein the first audio signal comprises a sound of a second hand, and wherein the remaining audio signals comprise at least one of a media sound, a notification sound, or a ringtone sound.

15. The wearable electronic device of claim 1, wherein the first audio signal includes a sound of a second hand output by a watch application executed by the one or more processors, and wherein the remaining audio signals includes at least one of a media sound, a notification sound, or a ringtone sound output by at least one of a media player application executed by the one or more processors or a notification application executed by the one or more processors.

16. The wearable electronic device of claim 1, wherein the one or more computer programs further include computer-executable instructions that, when executed by the one or more processors individually or collectively, cause the wearable electronic device to:

output audio signals identified as having the second property through the speaker based on the wearable electronic device being disconnected from the external device through the wireless communication circuit; or output the audio signals identified as having the second property through the external device based on the wearable electronic device being connected to the external device through the wireless communication circuit.

* * * * *